United States Patent
Browne et al.

(10) Patent No.: US 7,455,783 B2
(45) Date of Patent: Nov. 25, 2008

(54) METHOD FOR CENTRIFUGAL SEPARATION ENHANCEMENT

(75) Inventors: Neale Browne, Houston, TX (US); Catalin Ivan, Sugar Land, TX (US)

(73) Assignee: M-I L.L.C., Houston, TX (US)

( * ) Notice: Subject to any disclaimer, the term of this patent is extended or adjusted under 35 U.S.C. 154(b) by 73 days.

(21) Appl. No.: 11/401,599

(22) Filed: Apr. 11, 2006

(65) Prior Publication Data
US 2006/0243136 A1 Nov. 2, 2006

Related U.S. Application Data

(60) Provisional application No. 60/670,528, filed on Apr. 11, 2005.

(51) Int. Cl.
*B01D 17/038* (2006.01)
(52) U.S. Cl. .......................... 210/774; 175/66; 210/787; 494/37; 494/901
(58) Field of Classification Search ................ 175/66
See application file for complete search history.

(56) References Cited

U.S. PATENT DOCUMENTS

| | | | | |
|---|---|---|---|---|
| 3,737,037 A | * | 6/1973 | Bone, III | 175/66 |
| 4,482,459 A | * | 11/1984 | Shiver | 210/639 |
| 4,938,876 A | * | 7/1990 | Ohsol | 210/708 |
| 5,286,386 A | * | 2/1994 | Darian et al. | 210/639 |
| 5,344,570 A | * | 9/1994 | McLachlan et al. | 210/709 |
| RE35,815 E | * | 6/1998 | Landry | 210/766 |
| 5,882,524 A | * | 3/1999 | Storey et al. | 210/712 |
| 6,036,870 A | | 3/2000 | Briant et al. | |
| 6,132,630 A | * | 10/2000 | Briant et al. | 210/774 |
| 6,193,070 B1 | * | 2/2001 | Rowney et al. | 209/5 |
| 6,315,894 B1 | * | 11/2001 | Wiemers et al. | 210/96.1 |
| 6,607,659 B2 | * | 8/2003 | Hensley et al. | 210/87 |

\* cited by examiner

*Primary Examiner*—Peter A. Hruskoci

(57) ABSTRACT

A method for removing low gravity solids from an oil-based drilling fluid includes directing the drilling fluid into a first inlet of a first line in fluid communication with a centrifuge, injecting steam into the drilling fluid through a second inlet in the first line, wherein the second inlet is upstream from the centrifuge, directing the commingled drilling fluid and steam into the centrifuge, rotating the centrifuge at a rotational speed sufficient to separate solids from liquids, collecting solids from a solids discharge, and collecting effluent from an effluent outlet, wherein the effluent has low gravity solids in an amount less than 1.5%.

5 Claims, 1 Drawing Sheet

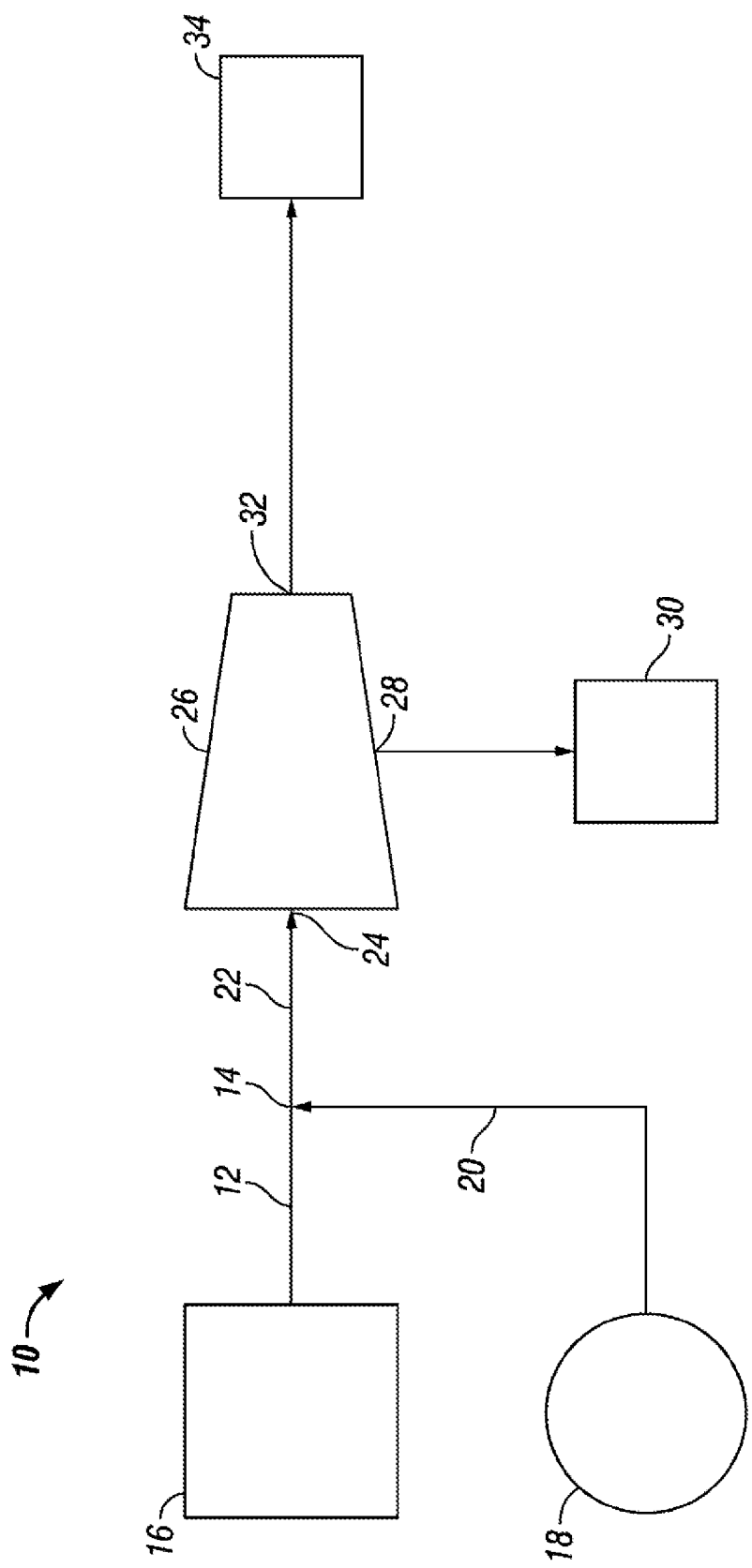

METHOD FOR CENTRIFUGAL SEPARATION ENHANCEMENT

This application claims priority to U.S. Provisional Patent Application Ser. No. 60/670,528 filed on Apr. 11, 2005 entitled, "Method and Apparatus for Centrifugal Separation Enhancement" incorporated herein by reference for all purposes.

BACKGROUND OF INVENTION

In the process of rotary drilling a well, drilling fluid, or mud, is circulated down the rotating drill pipe, through the bit, and up the annular space between the pipe and the formation or steel casing, to the surface. The drilling fluid performs different functions such as removal of cuttings from the bottom of the hole to the surface, to suspend cuttings and weighting material when the circulation is interrupted, control subsurface pressure, isolate the fluids from the formation by providing sufficient hydrostatic pressure to prevent the ingress of formation fluids into the wellbore, cool and lubricate the drill string and bit, maximize penetration rate, etc.

The required functions can be achieved by a wide range of fluids composed of various combinations of solids, liquids and gases and classified according to the constitution of the continuous phase mainly in two groupings: aqueous drilling fluids, and oil-based drilling fluids. In drilling water-sensitive zones such as reactive shales, production formations, or where bottom hole temperature conditions are severe or where corrosion is a major problem, oil-based drilling fluids are preferred.

Oil-based drilling fluids typically contain oil-soluble surfactants that facilitate the incorporation of water-wet clay or non-clay formation minerals, and hence enable such minerals to be transported to surface equipment for removal from circulation before the fluid returns to the drill pipe and the drill bit. The largest formation particles are rock cuttings, the size typically larger than 0.1 to 0.2 mm, removed by shale-shaker screens at the surface. Smaller particles, typically larger than about 5 μm, will pass through the screens, and must be removed by centrifuge or other means.

Oil-based drilling fluids have been used for many years, and their application is expected to increase, partly owing to their several advantages over water based drilling fluids, but also owing to their ability to be re-used and recycled, so minimizing their loss and their environmental impact.

As mentioned above, during drilling, formation particles become incorporated into the drilling fluid. Unless these are removed, they eventually alter the fluid's properties, particularly the Theological parameters, out of the acceptable range. However, formation particles that are less than about 5 to 7 μm in size are more difficult to remove than larger particles using conventional separation means such as shale shakers. These low gravity solids can build up in a mud system, causing inefficient drilling problems such as drill pipe sticking, increased pipe torque, and other high viscosity issues.

While low gravity solids may be removed from drilling fluids using mechanical means such as a centrifuge, it has been found that longer run-times are required to remove the colloidal particles, if the low gravity solids can be removed at all. Thus, there is a need for an apparatus that can be used with traditional solids separation equipment to reduce the run-time required to remove low gravity solids. Further, it would be an improvement in the art to have an apparatus that can be utilized both on active drilling projects to facilitate solids control equipment efficiency as well as by mud plants in reclaiming and/or reconditioning mud returned from field operations.

SUMMARY

In one aspect, the invention relates to a method for removing low gravity solids from an oil-based drilling fluid, the method including directing the drilling fluid into a first inlet of a first line in fluid communication with a centrifuge, injecting steam into the drilling fluid through a second inlet in the first line, wherein the second inlet is upstream from the centrifuge, directing the commingled drilling fluid and steam into the centrifuge, rotating the centrifuge at a rotational speed sufficient to separate solids from liquids, collecting solids from a solids discharge, and collecting effluent from an effluent outlet, wherein the effluent has low gravity solids in an amount less than 1.5%.

In another aspect, the invention relates to an apparatus for removing low gravity solids from an oil-based drilling fluid, the apparatus including a centrifuge having an inlet for receiving fluid, a solids discharge, and an effluent outlet, a steam generator providing steam to the drilling fluid upstream from the centrifuge inlet, wherein the steam is injected into the drilling fluid in an amount sufficient to separate liquid and solid particles such that the separated liquid includes less than 5.5.% solid particles, and wherein the solid particles in the separated liquid include low gravity solids in an amount less than 2%.

Other aspects and advantages of the claimed subject matter will be apparent from the following description and the appended claims.

BRIEF DESCRIPTION OF THE DRAWINGS

FIG. 1 is a schematic of an apparatus for injecting steam into an oil-based drilling fluid to enhance the removal of low gravity solids.

DETAILED DESCRIPTION

The claimed subject matter relates to an apparatus and method for removing low-gravity solids from an oil-based drilling fluid. The oil-based drilling fluid includes oil, water, and solids in relative proportions consistent with used drilling fluid that has been subjected to preliminary processes to remove large solids from the fluid. The solids remaining in the drilling fluid typically include a percentage of high gravity solids and a percentage of low gravity solids. High gravity solids are those solids that are dense, as in barite or hematite, while low gravity solids are those solids that have a lower density than barite. The oil and water in the used drilling fluid are present in proportionate amounts, the relationship between them often being expressed as an oil-to-water ratio.

Referring to FIG. 1, the apparatus 10 includes a steam generator 18 and a centrifuge 26. Oil-based drilling fluid to be treated is directed through a first line 12 from a tank 16 or mud plant or another process to prepare the oil-based drilling fluid or recovery. The steam generator 18 provides steam to a second line 20. The second line 20 directs the steam into the first line 14 such that the steam and the drilling fluid are commingled in a second portion 22 of the first line 14. In one embodiment, the steam injected has a temperature of 320 to 350 degrees Fahrenheit. In one embodiment the steam is injected into the first line in an amount in the range of 0.25 to 0.4% by volume of mixture of the drilling fluid and the steam.

The steam and drilling fluid mixture then continue through the first line 14 to the centrifuge 26 through a centrifuge inlet 24. In one embodiment the commingled steam and drilling fluid is fed into the centrifuge inlet 24 at a feed rate of about 20 gpm.

The centrifuge 26 includes an internally located bowl (not shown) to which the drilling fluid and steam mixture is directed. The bowl is rotated at a rate sufficient to separate solids entrained in the drilling fluid such that solids remaining in the effluent are less than 10% of the effluent. In one embodiment, the centrifuge is rotated at about 1,800 RPM. An internally located conveyor (not shown) directs solids towards a solids discharge 28 from the centrifuge 26 and collected in a cuttings box 30. The fluid and any remaining solids are directed to an effluent outlet 32 from the centrifuge 26 to a holding tank 34.

In one example, a typical drilling fluid was evaluated to determine its properties. It was found that the drilling fluid to be treated was 54.0% oil, 20.0% water and 26.0% solids. The corrected high gravity solids were 15.87% and the corrected low gravity solids were 9.06%. To establish a baseline, the drilling fluid was subjected to centrifugation alone. The effluent from the centrifuge was evaluated and found to contain 8% solids, wherein the corrected high gravity solids were 3.57% and the corrected low gravity solids were 3.45%.

Steam was injected into the drilling fluid immediately prior to the inlet to the centrifuge. The amount of steam injected was varied from 0.05 gpm to 0.10 gpm, while the pressure was varied from 88 to 100 psi. The injection of steam into the drilling fluid prior to centrifugation changed the properties of the effluent from the centrifuge. First, the percentage of solids in the effluent was reduced to less than 6%. While the percentage of high gravity solids was reduced somewhat, it was found that low gravity solids were nearly eliminated from the effluent. The percentage of low gravity solids were in the range of 0 to 1.01%.

One of skill in the art will appreciate that no chemicals have been added to the drilling fluid to facilitate removal of the solids. Thus, low gravity solids may be eliminated from drilling fluid to be reused by a process that is free of additional expensive chemicals. Further, the solids discharge from the centrifuge is free of polymers and surfactants that are often used to facilitate the removal of solids from drilling fluid to be treated and used again.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

The invention claimed is:

1. A method for removing low gravity solids from an oil-based drilling fluid, wherein the low gravity solids have a lower density than barite and include collodial particles, comprising:
    directing the drilling fluid into a first inlet of a first line in fluid communication with a centrifuge;
    injecting steam into the drilling fluid through a second inlet in the first line, wherein the second inlet is upstream from the centrifuge;
    directing the commingled drilling fluid and steam into the centrifuge;
    rotating the centrifuge at a rotational speed sufficient to separate solids from liquids;
    collecting solids from a solids discharge; and
    collecting effluent including said liquids from an effluent outlet, wherein steam is injected into the drilling fluid in an amount sufficient to separate liquid and solid particles, the effluent includes less than 5.5% solid particles, and has low gravity solids in an amount less than 1.5%.

2. The method of claim 1, wherein the steam is injected into the second inlet with a flow rate of 0.05 to 0.10 gallons per minute water equivalent.

3. The method of claim 2, wherein the steam is at a pressure in the range of 88 to 100 pounds per square inch.

4. The method of claim 2, wherein the steam is at a temperature in the range of 320 to 350 degrees Fahrenheit.

5. The method of claim 1, wherein the steam is injected into the first line in an amount in the range of 0.25 to 0.4% by volume of a mixture of the drilling fluid and the steam.

\* \* \* \* \*